(12) United States Patent  (10) Patent No.: US 9,172,550 B2
Kapur et al.  (45) Date of Patent: Oct. 27, 2015

(54) MANAGEMENT OF A MULTICAST SYSTEM IN A SOFTWARE-DEFINED NETWORK

(71) Applicant: International Business Machines Corporation, Armonk, NY (US)

(72) Inventors: Ashish Kapur, Santa Clara, CA (US); Vishal Shukla, Santa Clara, CA (US)

(73) Assignee: GLOBALFOUNDRIES U.S. 2 LLC COMPANY, Hopewell Junction, NY (US)

( * ) Notice: Subject to any disclaimer, the term of this patent is extended or adjusted under 35 U.S.C. 154(b) by 165 days.

(21) Appl. No.: 13/946,034

(22) Filed: Jul. 19, 2013

(65) Prior Publication Data

US 2015/0023347 A1  Jan. 22, 2015

(51) Int. Cl.
*H04L 12/26* (2006.01)
*H04L 12/18* (2006.01)

(52) U.S. Cl.
CPC ............ *H04L 12/18* (2013.01); *H04L 12/1886* (2013.01)

(58) Field of Classification Search
USPC .................................. 370/229–240, 254–258
See application file for complete search history.

(56) References Cited

U.S. PATENT DOCUMENTS

| 8,953,500 | B1* | 2/2015 | Shen et al. ..................... 370/256 |
| 2004/0213177 | A1* | 10/2004 | Moritani et al. ............... 370/328 |
| 2012/0008629 | A1* | 1/2012 | Chiba et al. ................... 370/392 |
| 2012/0224474 | A1 | 9/2012 | Beser |
| 2012/0327775 | A1 | 12/2012 | Han et al. |
| 2013/0010803 | A1 | 1/2013 | Yamaguchi |
| 2013/0223226 | A1* | 8/2013 | Narayanan et al. ............ 370/236 |
| 2013/0223442 | A1* | 8/2013 | Narayanan et al. ............ 370/389 |
| 2014/0119367 | A1* | 5/2014 | Han et al. ....................... 370/389 |
| 2014/0177638 | A1* | 6/2014 | Bragg et al. ................. 370/395.5 |
| 2014/0192645 | A1* | 7/2014 | Zhang et al. ................... 370/235 |
| 2014/0226525 | A1* | 8/2014 | Eastlake et al. ................ 370/254 |
| 2014/0229630 | A1* | 8/2014 | Narayanan et al. ............ 709/238 |
| 2014/0269328 | A1* | 9/2014 | Venkataswami et al. ..... 370/238 |
| 2014/0286336 | A1* | 9/2014 | Narayanan et al. ............ 370/392 |
| 2014/0310388 | A1* | 10/2014 | Djukic et al. .................. 709/221 |
| 2014/0376549 | A1* | 12/2014 | Lu ................................. 370/390 |
| 2015/0043589 | A1* | 2/2015 | Han et al. ....................... 370/392 |

OTHER PUBLICATIONS

OpenFlow Switch Specification, Version 1.0.0, Dec. 31, 2009.*

(Continued)

*Primary Examiner* — Kwang B Yao
*Assistant Examiner* — Juvena Loo
(74) *Attorney, Agent, or Firm* — Anthony Canale; Roberts Mlotkowski Safran & Cole, P.C.

(57) ABSTRACT

A system and method are provided for of a Multicast system by a controller in a software defined network. The method may include, receiving a request for a multicast stream from a first switch of the software defined network. The request may have originated from a requestor using an Internet Group Management Protocol (IGMP). The method may further include, adding the request to a table, wherein the table is designated to have requests from IGMP using requestors for multicast streams. The method may further include, determining whether the request for the multicast stream matches with a multicast data transmission from a sender received by the controller. The method may further include, initiating a connection of the multicast between the requestor and the sender if the request matches the multicast data transmission.

14 Claims, 4 Drawing Sheets

(56) References Cited

OTHER PUBLICATIONS

IBM, "IBM System Networking RackSwitch G8264", IBM Redbooks, pp. 1-20, © Copyright International Business Machines Corporation 2011, Last Updated Feb. 4, 2013. www.redbooks.ibm.com/technotes/tips0815.pdf.

Sun/Oracle, "Sun Network 10GbE Switch 72p Release 1.2.2 Product Notes", Apr. 2013, Copyright © 2010, 2013 Oracle.

Vujosevic, P., "Investigation and Validation of the OpenFlow protocol for next generation converged optical networks", Master Thesis Report, Jul. 2011, Barcelona School of Telecommunication Engineering, Barcelona, Spain.

* cited by examiner

| | column 1 | column 2 | column 3 | column 4 | column 5 | column 6 | column 7 |
|---|---|---|---|---|---|---|---|
| 205A | SWITCH # | INGRESS PORT | MULTICAST GROUP | SOURCE | TIMER | SENDER SWITCH/POR | PATH |
| | A | 10 | 225.10.10.10 | * | 4:00 | * | * |
| | B | 2 | 225.10.10.10 | 1.1.1.1 | 3:30 | NA | NA |

→

| | column 1 | column 2 | column 3 | column 4 | column 5 | column 6 | column 7 |
|---|---|---|---|---|---|---|---|
| 205B | SWITCH # | INGRESS PORT | MULTICAST GROUP | SOURCE | TIMER | SENDER SWITCH/POR | PATH |
| | A | 10 | 225.10.10.10 | ** | NA | B/2 | ** |
| | B | 2 | 225.10.10.10 | 1.1.1.1 | NA | NA | NA |

MANAGEMENT OF A MULTICAST SYSTEM IN A SOFTWARE-DEFINED NETWORK

TECHNICAL FIELD

This disclosure generally relates to communication on a network, and in particular, to communication involving multicast systems in a network.

BACKGROUND

A network is a collection of computers and other hardware components interconnected by communication channels that allow sharing of network resources and information. Where at least one process in one device is able to send/receive data to/from at least one process residing in a remote device, then the two devices are said to be in a network. Generally, more than one computer interconnected through a communication medium for information interchange is called a computer network. Modern devices often use networks to connect with servers for information and services. The need for mobile devices to connect to, and interact with, a network is now common.

SUMMARY

An apparatus and method are provided for of a Multicast system by a controller in a software defined network. The method may include, receiving a request for a multicast stream from a first switch of the software defined network. The request may have originated from a requestor using an Internet Group Management Protocol (IGMP). The method may further include, adding the request to a table, wherein the table is designated to have requests from IGMP using requestors for multicast streams. The method may further include, determining whether the request for the multicast stream matches with a multicast data transmission from a sender received by the controller. The method may further include, initiating a connection of the multicast between the requestor and the sender if the request matches the multicast data transmission.

In another embodiment, an apparatus for management of a multicast system in a software defined network may be provided. The apparatus may include, a controller in communication with the software defined network. The apparatus may further, include a memory available to the controller to store a table. The table may store a request for a multicast stream, the request having originated from a requestor using Internet Group Management Protocol (IGMP). The apparatus may further include, an input/output module available to the controller to receive multicast data transmission for a multicast stream from a sender. The apparatus may further include, a module available to the controller to match the multicast data transmissions to the request and to initiate a connection of the multicast stream between the requestor and the sender.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

In embodiments of the presented invention a controller in a software defined network may be able to organize and facilitate the request by an entity, e.g., a requestor, of a network to find and join a multicast stream from another entity, e.g., a sender, on the network. Networks may be used by electronic devices attached to, or part of the network, to transmit, send, broadcast, or receive data. One type of data transmitted over networks may be a multicast stream. In networking, the multicast stream is the delivery of a message or information to a group of destination electronic devices, such as computers, simultaneously in a single transmission from a single source. In various embodiments, copies of the transmission may be created in other network elements, such as routers, for dissemination to the electronic devices receiving the transmission, such as the requestor. Multicasts may involve two types of entities, the sender who sends out, or transmits, the multicast and the requestor who seeks out and receives the multicast. In various embodiments, the transmission of the multicast may be referred to as transmitting, delivering, enabling, or sending the multicasts transmissions. A sender may transmit out the availability of the multicast it is or will make by transmitting multicast transmission data into a network. The multicast transmission data may include, but is not limited to, routing, content, security, or communication protocols or requirements.

While the entities may be known as a requestor and a sender both entities may transmit and receive data, information, or communication from each other during the multicast stream. In various embodiments, the requestor may become a sender or the sender may become a requestor. In various embodiments, the requestor can be a sender for some other multicast streams, for which there may be a different requestor. One example of a multicast may be an IP multicast. The IP multicast may be employed in Internet Protocol (IP) applications of streaming media and Internet television, for example.

A software-defined network (SDN) may include using networking hardware and software for routing or switching in a way that may separate or abstract elements of the network system(s). In some embodiments, the elements may be called a control plane and a data plane. The SDN may decouple the systems that make decisions about where traffic is sent, sometimes referred to as the control plane, from the underlying system that forwards traffic to the selected destination, sometimes referred to as the data plane. The join SDN may include network devices. The network devices of the software-defined network may be network devices because they adhere to the protocol of the SDN and may communicate with one or more other network devices in the SDN. Examples of network devices may include, but are not limited to, switching devices, forwarder devices, routers, and hub devices. Network devices may sometimes be referred to as nodes, target nodes, or initiator nodes. Network devices may be logical, virtual, physical, and/or discrete devices. Examples of these include, but are not limited to, computing devices like servers, client computers, client computing devices, server computers, server computing devices, storage devices, and mobile devices. A type of a SDN is OpenFlow or an OpenFlow network.

OpenFlow may include a communications protocol that gives a controller access to the forwarding plane of a network switch or router over the network. In an OpenFlow network the data path portion may resides on the switch, while high-level routing decisions may be moved to a separate controller. In various embodiments, the separate controller may be a server. The OpenFlow switch and controller may communicate via an OpenFlow protocol. The OpenFlow protocol may define messages such as, but not limited to, packet-received, send-packet-out, modify-forwarding-table, and get-stats. When a new packet comes into an OpenFlow switch, the packet may be forwarded to the OpenFlow controller. The controller may determine how the packet is to be routed and communicates the routing instructions to the switch. Every packet following the new packet that is from the same packet flow and received at the switch may be routed according to these instructions. A packet flow is a group of packets with similar properties. Packet header fields may be used to define a packet as belonging to a particular packet flow.

When data or communication is sent to, or through, the OpenFlow network that is of another type of protocol than OpenFlow protocol errors or failures may occur. This may prevent the data or communication from occurring. Embodiments of the presented invention may enable the use of Internet Group Management Protocol (IGMP) requests for multicast streams using the OpenFlow network. Such compatibility may reduce upgrade costs or allow for more efficient use of the networks or systems involved.

The Internet Group Management Protocol (IGMP) is a communications protocol that may be used by hosts and adjacent routers on IP networks to establish multicast group memberships. In various embodiments, IGMP may be an integral part of IP multicast. IGMP may be used for one-to-many networking applications such as online streaming video and gaming, and in some embodiments, allows more efficient use of resources when supporting these types of applications. In various embodiments, IGMP may be used on IPv4 networks. IGMP may operate between a client computer and a local multicast router. Switches featuring IGMP snooping may derive useful information by observing IGMP transactions. In various embodiments, IGMP may operate above the network layer, similar to other network management protocols such as ICMP. In various embodiments, IGMP requests may be matched with multicast streams using a Protocol Independent Multicast (PIM). The PIM may be used between the local and remote multicast routers, or to direct multicast traffic from the multicast server to many multicast clients.

Figure 1A:
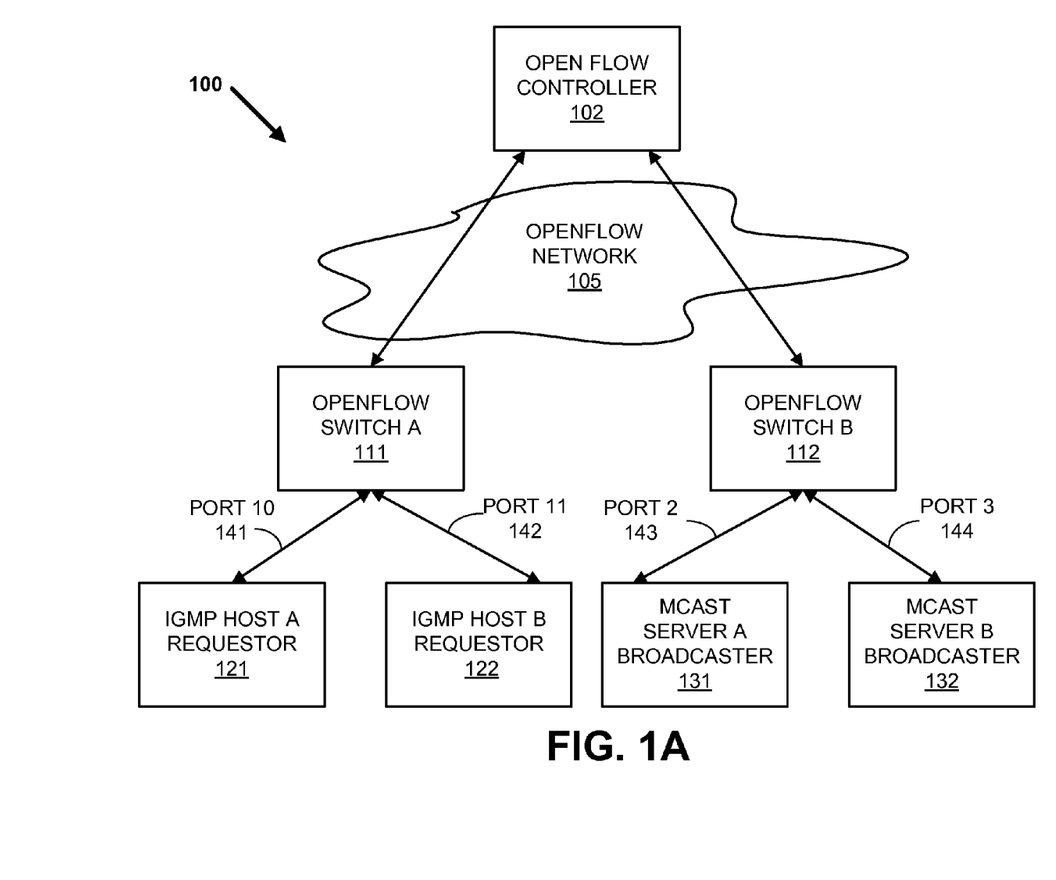
FIG. 1A depicts a high-level block diagram of an exemplary network of systems, for implementing an embodiment of the invention.
Figure 1B:
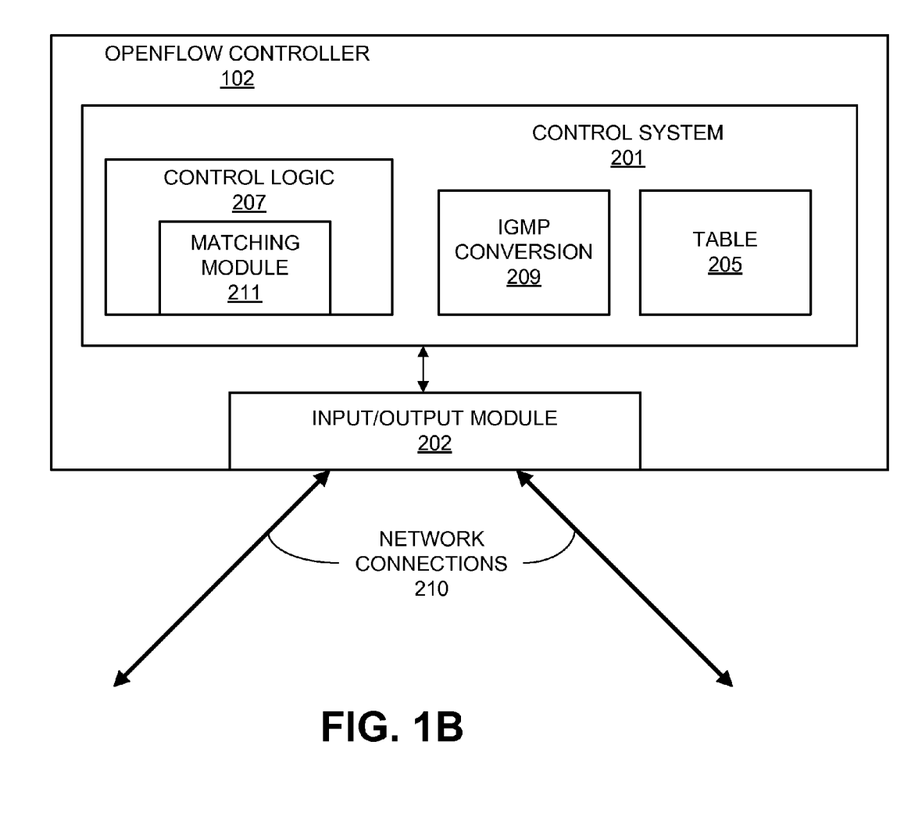
FIG. 1B depicts a high-level block diagram of an exemplary OpenFlow controller, for implementing an embodiment of the invention.

FIG. 1A and FIG. 1B depict high-level block diagrams of systems for implementing an embodiments of the invention. FIG. 1A depicts a high-level block diagram of an exemplary network 100 of systems or entities, for implementing an embodiment of the invention. FIG. 1B depicts a high-level block diagram of an exemplary OpenFlow controller 102, for implementing an embodiment of the invention. The illustrated embodiment of network 100 may contain the OpenFlow controller 102, OpenFlow switches 111 and 112 respectively, IGMP host A 121 and IGMP host B 122, and MCast server A 131 and MCast server B 132. In the illustrated embodiment, either one or both of the IGMP hosts 121 and 122 may be requestors for a multicast stream using IGMP to request the multicast stream through network 100.

In the illustrated embodiment, the IGMP host A 121 and IGMP host B 122 may be a systems, devices, or entities requesting or searching for a specified multicast and using IGMP protocol for the request. The MCast server A 131 and MCast server B 132 may be systems, devices, or entities that may be senders of multicast streams.

In the illustrated embodiment, IGMP host A 121 and IGMP host B 122 are in communication with OpenFlow switch A 111. IGMP host A 121 and IGMP host B 122 are identified as requestors for multicast streams in the illustrated embodiment, this will be described in more detail below. IGMP host A 121 may be connected to OpenFlow switch A 111 through a port 10 141 and IGMP host B 122 may be connected through a port 11 142. The ports are the logical locations on the switch where devices connect to the switch. The port designation may be made by either software or hardware in the switch, and may be identified to other members of the network for routing of communication and data. The use of respective ports 10 and 11, 141 and 142 here, is for example only and any port number may be used that is available to the switch. In various embodiments this may be through a cable or wire connection, a hardware link, a network connection, or wireless communication.

Similarly, MCast server A 131 and MCast server B 132 may be connected to OpenFlow switch B 112. In the illustrated embodiment, MCast server A 131 and MCast server B 132 are identified as senders of multicast streams and multicast data transmissions about those multicast streams, this will be described in more detail below. MCast server A 131 may be connected to OpenFlow switch B 112 through a port 2 143 and MCast server B 132 may be connected through a port 3 144. As mentioned previously, the port is the logical location on the switch where devices connect to the switch. The port designation may be made by either software or hardware in the switch, and may be identified to other members of the network for routing of communication and data. The use of respective ports 2 and 3, 143 and 144 here, is for example only and any port number may be used that is available to the switch.

OpenFlow switch A 111 and OpenFlow switch B 112 may be connected to OpenFlow controller 102 using an OpenFlow network 105. In various embodiments, the OpenFlow switches, such as OpenFlow switch A 111 and OpenFlow switch B 112, may be considered inside, part of, or attached to the OpenFlow network 105. OpenFlow network 105 may be hardware based network or a wireless based network or a combination of both. The OpenFlow network 105 may include one or more devices (not shown), such as switches, routers, gateways, and other similar network devices. In various embodiments, the individual elements illustrated for network 100 may be more numerous or absent. In various embodiments, an IGMP host and a MCast server may share switches. In other embodiments, the IGMP host may also be a MCast server, and the MCast server may also be an IGMP host. The OpenFlow controller 102 may resolve the request for the multicast stream from either, or both, IGMP host A 121 and IGMP host B 122 with the multicast data transmission from either, or both, MCast server A 131 and MCast server B 132. In various embodiments of the presented invention, the OpenFlow controller 102 may use one or more tables for organizing, matching, and resolving the request from a requestor, such as IGMP host A 121 or IGMP host B 122, with the multicast data transmission from senders, such as MCast server A 131 or MCast server B 132.

FIG. 1B depicts a high-level block diagram of the exemplary OpenFlow controller 102, for implementing an embodiment of the invention. The illustrated OpenFlow controller 102 may include a control system 201 that may interact with the input/output module (I/O) 202. The I/O module may include connectors, buffers, logic, hardware, firmware, or software to allow the OpenFlow controller 102 to connect and communicate with the OpenFlow network 105. In various embodiments, the I/O module may be singular or plural. The I/O module may be of varying types and styles. In various embodiments, the I/O module may include wireless or optical connections and systems.

The OpenFlow controller 102 is a device which controls the OpenFlow network 105. In some embodiments, the OpenFlow controller 102 may be connected to the OpenFlow network 105 but not part of it. The OpenFlow controller 102 may be considered an OpenFlow controller 102 because it adheres to or uses the OpenFlow protocol. In various embodiments, the OpenFlow controller may program the software, e.g., the control plane, of the network devices of the OpenFlow network 105, such as OpenFlow switch A 111 and OpenFlow switch 112.

The illustrated control system 201 may include control logic 207, IGMP conversion system 209, and table 205. The control system 201 may consist of various hardware and software. The hardware and software elements may include, but are not limited to central processing unit(s), memory and data storage, data buses, support systems for communication and support between elements, firmware systems, operating system(s), communication protocols, and translation technologies. In the illustrated embodiment, the request for a multicast stream from the OpenFlow switch A 111, the request having originated from a requestor, IGMP host A 121, may arrive to the OpenFlow controller 102 through one of the network connections 210. Upon receiving the request, the control logic 207 in the control system 201 may determine that the request originated from an IGMP source, here IGMP host A 121. The control logic 207 may process the IGMP request using the IGMP conversion system 209. In various embodiments, this may be a subset of the control logic 207 or it may be a separate entity for determining the contents of the IGMP request. The IGMP conversion system may allow the controller logic 207 of the OpenFlow controller to understand IGMP requests that are received at the OpenFlow controller 102. The IGMP conversion system 209 may allow the control logic to determine the contents of the request and then add the request to the table 205. The table 205 is described in greater detail below. In various embodiments, the contents of the request may be fully or partially added to the table 205. The addition to the table 205 may be done by either the controller logic 207 or the IGMP conversion system 209.

The control logic 207 may include a matching module 211 that may be used to match the request now on table 205 with the multicast data transmission from a sender that has been received by the OpenFlow controller 102. The multicast data transmission may arrive to the OpenFlow controller 102 through one of the network connections 210 using the I/O module 202. The multicast data transmission is information about a multicast stream from a sender, here MCast server A 131, and is described in greater detail below. In various embodiments, the information from the multicast data transmission may be added to table 205. In other embodiments, information from the multicast data transmission may have a separate table, or be stored elsewhere by the OpenFlow controller 102. The matching module 211 of control logic 207 may match the multicast data transmission with the request on the table 205. In other embodiments, the matching module 211 may be separate from the control logic 207 and either elsewhere in the OpenFlow controller 102 or remotely but available to the OpenFlow controller 102. It is contemplated that the matching module 211 may use any type of program, algorithm, or process that allows for the matching an element in a table to another data for matching of the multicast data transmission to the request entry on the table 205. In various embodiments, the control logic 207 or the matching module 211 may update the table to reflect the match of the request for broadcast of the multicast stream with the multicast data transmission. In various embodiments, the matching module 211 may initiate the connection of the multicast stream between the requestor and the sender. In other embodiments, a second module (not shown) may be used to initiate the connection. In various embodiments, the elements or modules within the control system 201 for matching, recording, updating the table 205, and initiating the connection between requestor and sender may be separate or individual, partially combined, or single combined elements. In various embodiments, elements shown for the OpenFlow controller 102 may be more numerous or absent.

Figure 2:
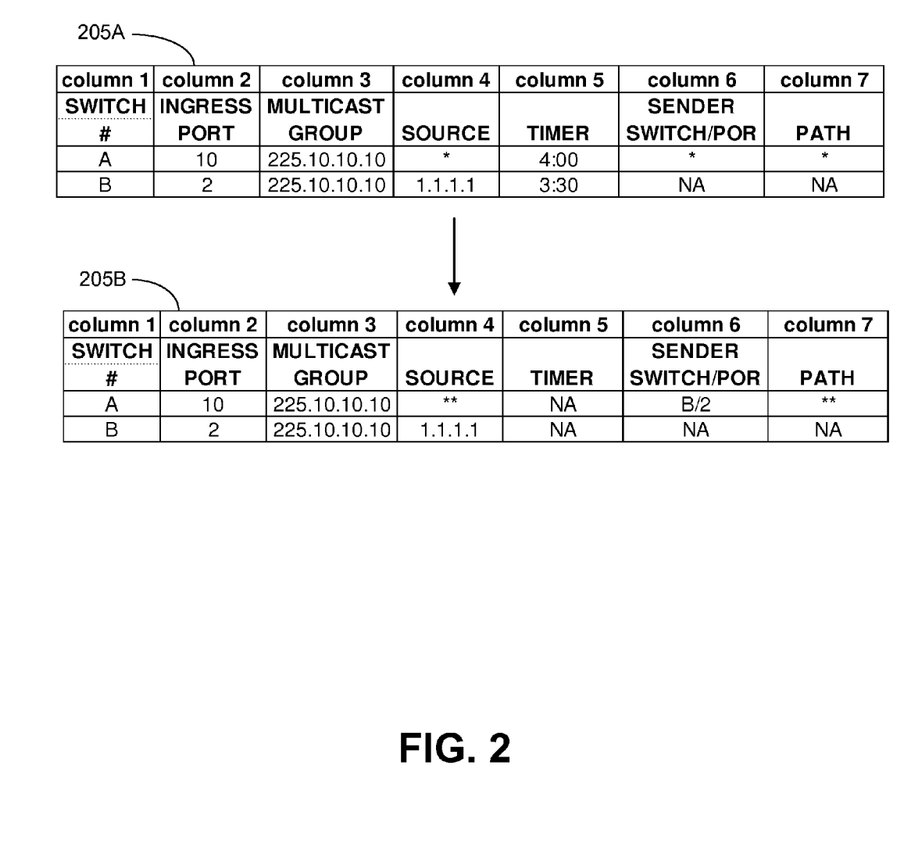
FIG. 2 is a block diagram of entries in a table, according to an embodiment of the invention.

FIG. 2 is a detailed illustration of a table 205 that may be used by the OpenFlow controller 102 to resolve the IGMP request for a multicast stream. In various embodiments, a multicast stream is the delivery of a message or information to a group of destination requestors, or receiving entities, simultaneously in a single transmission from the sender, sometimes referred to as a source. In the illustrated embodiment, the table 205 may be used to track IGMP host requests, multicast data transmissions from MCast servers, and matches made between them by the OpenFlow controller 102. The illustrated table is shown at two different time periods.

Table 205A is the first time period. In table 205A, the OpenFlow controller 102 may include requests for multicast streams and sources of multicast streams. In the illustrated example, the first entry on table 205A is a request for a multicast stream. Column 1 identifies the switch making the request as OpenFlow switch A 111 and column 2 identifies the ingress port on the switch making the request as port 10 141. Column 3 identifies a multicast group involved, an example of 225.10.10.10 is shown. Column 4 shows the source of the multicast group, here a "*" is used to show this entry is a request for a multicast. In various embodiments, there may be an IP address listed in addition to a *. This may mean that the request is to get multicast stream only from a sender of the specified IP address. Column 5 is a timer for the request. In some embodiments, the timer may show the time before a timeout of the request. Column 6 may show the senders switch and port. Here a "*" may be used to indicate it is currently unfound or not yet linked to a sender. Column 7 may show the path for connecting the requesting IGMP host, for example IGMP host A 121, to the broadcast entity. Once again, a "*" may be used here to indicate it is currently unfound or not yet linked to a sender.

In the illustrated example, the second entry on table 205A is information on sender or multicast stream from multicast transmission data. Column 1 identifies the switch making the multicast stream as OpenFlow switch B 112 and column 2 identifies the ingress port on the switch that is making the multicast stream as port 2. Column 3 identifies the multicast group involved, the example of 225.10.10.10 is shown. Column 4 shows the source of the multicast group, here an example of 1.1.1.1 is used is used. Column 5 is the timer for the multicast stream, it may show the time before timeout of the multicast stream if no requesters are found. Column 6 may show switch and port of the sender. Here a "NA" may be used since it is a sender not a requestor. Column 7 may show the path for connecting the requesting IGMP host, for example IGMP host A 121, to the broadcast entity. Once again, a "NA" may be used here to indicate this is a sender instead of a requestor.

The OpenFlow controller 102 may use the table 205A to match senders and requestors. In the illustrated example, the OpenFlow controller 102 may match the sender from OpenFlow switch B 112 port 2 143 to the request made by OpenFlow switch A 111 port 10 141 since the multicast group address is matched. With the match made, the OpenFlow controller 102 may update the table 205A to table 205B.

In the illustrated example, the first entry on table 205B has been updated in the following ways. The column 4 entry for the source has been updated to "" indicating that it is a request that has been met. In various embodiments, the IP address of the Sender may also be used here to tell from which sender the multicast traffic is being met. In addition to the "",  may also mean that the entry is matched already, and should have values in Column 6 and 7. The column 5 entry for the timer has changed to "NA", with the request being fulfilled no timeout timer is required. The column 6 entry for the sender switch/port has been updated to "B/2" to reflect the match made to OpenFlow switch B 112 port 2 143. The column 7 entry has been updated to a "" which may be the shortest or most efficient path between the sender and the requestor as determined by the OpenFlow controller 102 and used to link the two. The second entry, for OpenFlow switch B 112 port 2 143, has been updated also in table 205B. The column 5 entry for the timer has been changed to "NA". With a requestor being matched to the sender the need for a timeout timer has been eliminated and is reflected here. In the illustrated example, no other table entries for OpenFlow switch B 112 port 2 143 have been updated in table 205B. Since the sender from OpenFlow switch B 112 port 2 143 may be linked to several requestors columns used by requestor entries may be unchanged for broadcast entries on the table once a match is made by the OpenFlow controller 102. In various embodiments, the Column 7 entry for sender may have multiple paths recorded, to identify each requestor match and corresponding match with the sender.

In other embodiments, the columns and type of data in each may be more numerous, a different order, or absent. Data entries in each column may also use different symbols or data entries to reflect the same type of entry. Data entries may also be divided out or spread out over more columns. In various embodiments, multiple tables may also be used by the OpenFlow controller 102 instead of the single table shown. For example, a first table may be used just for requestors, a second table for senders, and a third table for matches. In various embodiments, one table may refer to another table. For example, the first table may look up a value based upon switch and in turn reference a second table that uses has timeout times. It is contemplated that, a variety of tables, parameters, metrics, and selection criteria may possibly be used and be within the scope of the invention. In various embodiments, the table, or tables, may be stored in memory accessible to the system.

Figure 3:
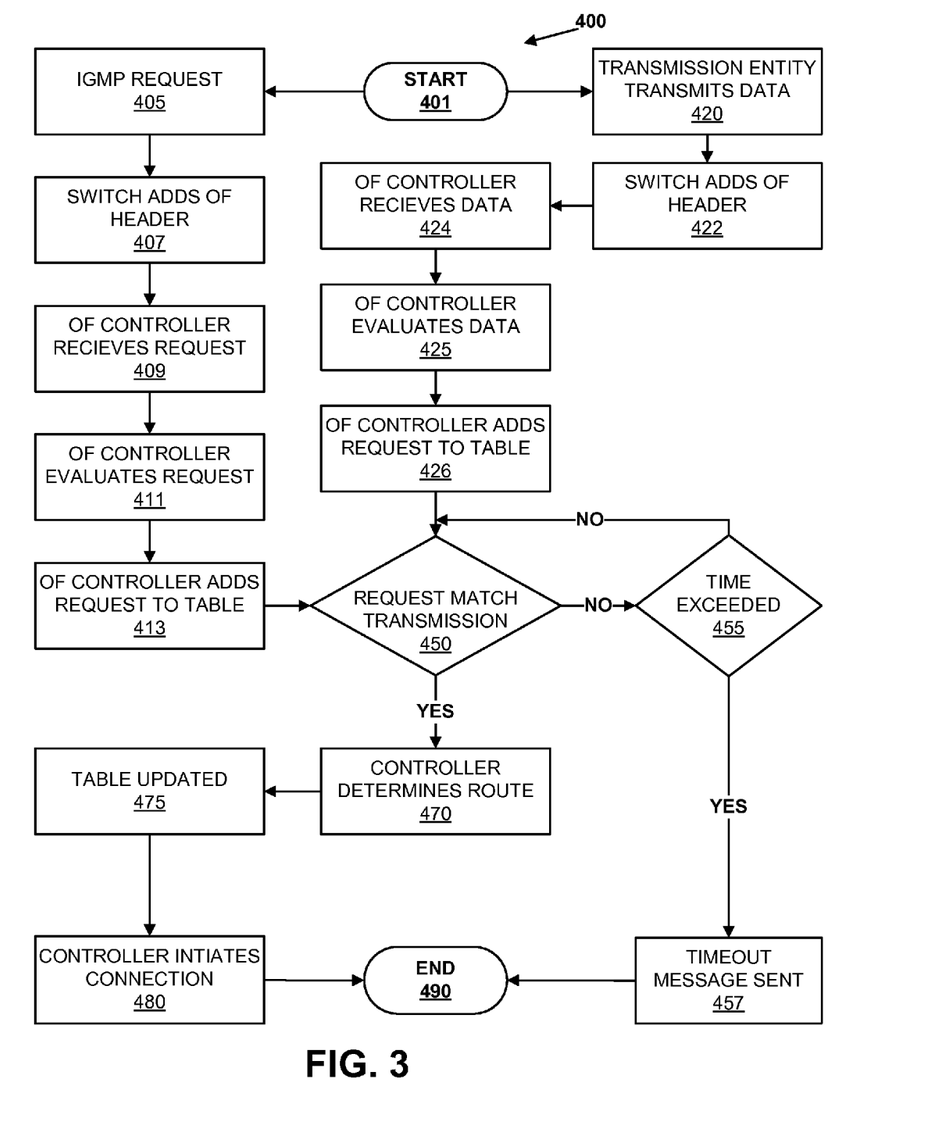
FIG. 3 is a flowchart illustrating a method for management of PIM/IGMP systems on an open flow network, according to an embodiment of the invention.

FIG. 3 is a flowchart illustrating a method 400 for managing an IGMP communication, a request for a multicast stream, by a controller, e.g., the OpenFlow controller 102, according to an embodiment. The method may start at block 401. In block 405, the IGMP Host A 121 transmits a request for a broadcast into the network 100. In block 407, the OpenFlow switch A 111 receives the request transmission from the IGMP host A 121. The OpenFlow switch A 111 may then add an OpenFlow header to the request transmission and release it to the OpenFlow network 105. In various embodiments, the switch may encapsulate the request and add the header before releasing it.

In block 409, the OpenFlow controller 102 may receive the multicast stream request with the header. In various embodiments, the request may be received directly from the OpenFlow switch A 111 by the OpenFlow controller 102, or the request may transverse through several other entities in the OpenFlow network 105, such as additional switches or controllers, before reaching the OpenFlow controller 102. In block 411, the OpenFlow controller 102 may evaluate the request. The evaluation may include determining the request is from an IGMP host and the contents of the request. This may be determined using information in the header by the OpenFlow switch A 111 or may be done by evaluating the encapsulated request. This evaluation, including determining the contents of the request, may be done by software or hardware on or available to the OpenFlow controller. In various embodiments, the software or hardware may by specific to evaluating IGMP requests or it may be part of a larger entity. In block 413, the request of IGMP host A 121 is added to the table 205A used by the OpenFlow controller 102 to manage requests from IGMP using entities.

In block 420, a transmission entity transmits multicast data transmission about a multicast stream to OpenFlow switch B 112. In block 422, the OpenFlow switch B 112 receives the multicast data transmission from the transmission entity, e.g., MCast server A 131. The OpenFlow switch B 112 may then add an OpenFlow header to the multicast data transmission and release it to the OpenFlow network 105. In various embodiments, the switch may encapsulate the multicast data transmission and add the header before releasing it.

In block 424, the OpenFlow controller 102 may receive the multicast data transmission with the header. In various embodiments, the transmission may be received directly from the OpenFlow switch B 112 by the OpenFlow controller 102, or the transmission may transverse through several other entities in the OpenFlow network 105, such as additional switches or controllers, before reaching the OpenFlow controller 102. In block 425, the OpenFlow controller 102 may evaluate the multicast data transmission. The evaluation may include determining the source and the contents of the multicast data transmission. This may be determined using information in the header by the OpenFlow switch B 112 or may be done by evaluating the encapsulated multicast data transmission. This evaluation, including determining the contents of the multicast data transmission, may be done by software or hardware on or available to the OpenFlow controller 102. In various embodiments, the software or hardware may by specific to evaluating multicast data transmission or it may be part of a larger entity. In block 426, the multicast data transmission of MCast server A 131 is added to the table 205A used by the OpenFlow controller 102.

In various embodiments, events in blocks 420 through 426 may occur concurrently, previously, or after events in blocks 405 through 413. In various embodiments, a multitude of each or both series of events, blocks 405 through 413 and blocks 420 through 426 respectively, may occur as multiple requests or multicast data transmissions enter the network 100.

In block 450, the matching module 211 of OpenFlow controller 102 may determine, as previously discussed, if there is a match for the request from the IGMP host A 121 entered in table 205A. If no match is found for the request the method 400 may proceed to block 455. In block 455 a determination is made if the timeout time has been exceeded. In various embodiments, the timeout may be determined by various software or hardware available to the OpenFlow controller 102. If the timeout time has not been exceeded method 400 may return to block 450 to determine if a match is found for the request of IGMP host A 121. If it is determined in block 455 that the timeout time has been exceeded, in block 457 a timeout message may be sent from the OpenFlow controller 102 to the IGMP host A 121 or MCast server A 131, depending on which has expired, informing it of the timeout occurrence. In various embodiments, the OpenFlow controller 102 may also remove the request from the table 205, update the table 205A entry to reflect the timeout, or query the IGMP host A 121 or MCast server A 131 for instruction. The method 400 may then end in block 490.

If in bock 450, a match is found for the request from IGMP host A 121 entered into table 205A, as shown in FIG. 2, then the method may proceed to block 470. In block 470, the matching module 211 of the OpenFlow controller 102 may determine, as previously discussed, a route for a connection between the requestor and the sender. This route may include a path through the network, the SDN, or another network the controller is aware of. For example a route may be found between the requester, IGMP host A 121, and the sender, MCast server A 131. In various embodiments, the determined path may exclude the OpenFlow controller 102. In various embodiments, the path may be determined by various metrics including, but not limited to, connection speed, routing distances, minimum or maximum communication traffic metrics, or security requirements.

With the path of communication determined, in block 475 the table 205A may be updated to table 205B. In the example of FIG. 2 this is the updating of the table from 205A to 205B. The entry for the request from IGMP host A 121 is updated to reflect that the request is matched to a multicast stream from MCast server A 131. The entry for the multicast data transmission from MCast server A 131 may also be updated to reflect it being matched to a requestor, IGMP host A 121. In block 480, the OpenFlow controller 102 may initiate the connection between the requestor, IGMP host A, and the sender, MCast server A 131. In various embodiments, the OpenFlow controller 102 may communicate with a network device of the determined route that is in the software defined network. The communication may include installing a direct entry in the network device for enabling the multicast (which may be a group of packets with similar properties, i.e., a packet flow) through the determined route. In various embodiments, the connection may be initiated prior to or at the same time as the table being updated in block 475. The method 400 may then end in block 490.

While this disclosure has described the details of various embodiments shown in the drawings, these details are not intended to limit the scope of the invention as claimed in the appended claims.

What is claimed is:

1. A method, comprising:
receiving, by a controller, a request for a multicast stream from a first switch of a software defined network, the request having originated from a requestor using Internet Group Management Protocol (IGMP), wherein the controller is configured to manage a multicast system in the software defined network;
receiving, by the controller, the multicast stream, wherein the multicast stream is encapsulated with a software defined network header;
adding, by the controller, the request to a table, wherein the controller is configured to organize, match, and resolve the request using the table, and wherein the table is designated to store requests received from requestors using IGMP for multicast streams;
receiving, by the controller, a multicast data transmission from a sender;
determining, by the controller, that the request for the multicast stream matches with the received multicast data transmission; and
initiating, by the controller, in response to the determining that the request for the multicast stream matches with the received multicast data transmission, a connection of the multicast stream between the requestor and the sender, if the request matches the multicast data transmission.

2. The method of claim 1, wherein the software defined network is an OpenFlow network.

3. The method of claim 2, wherein:
the multicast data transmission is encapsulated with an OpenFlow header.

4. The method of claim 2,
wherein the software defined network header is an OpenFlow header.

5. The method of claim 1, further comprising:
determining, by the controller, a route, based on a metric, for the connection between the requestor and the sender.

6. The method of claim 5, further comprising;
communicating, by the controller, with a network device in the software defined network and of the determined route, to install a direct entry in the network device in order to cause the multicast stream to be routed through the network device.

7. The method of claim 1, further comprising:
updating, by the controller, the table to reflect the match of the request for the multicast stream with the multicast data transmission.

8. An apparatus, comprising:
a controller in communication with a software defined network, wherein the controller is configured to manage a multicast system in the software defined network, the controller including:
a memory, available to the controller, the memory configured to store a table, wherein the controller is configured to organize, match, and resolve a request using the table, and wherein the table is configured to store a request for a multicast stream, the request having originated from a requestor using Internet Group Management Protocol (IGMP), wherein the multicast stream is encapsulated with a software defined network header;
an input/output module, available to the controller, that is configured to receive a multicast data transmission for the multicast stream from a sender; and
a module, available to the controller, that is configured to match the received multicast data transmissions to the request and that is configured to initiate a connection of the multicast stream between the requestor and the sender.

9. The apparatus of claim 8, wherein the software defined network is an OpenFlow network.

10. The apparatus of claim 9, wherein the software defined network header is an OpenFlow header.

11. The apparatus of claim 9, wherein the request for the multicast data transmission is encapsulated with an OpenFlow header.

12. The apparatus of claim 8, wherein the controller is configured to determine, based on a metric, a route for the connection for the multicast stream between the requestor and the sender.

13. The apparatus of claim 12, wherein the controller is configured to communicate with a network device in the software defined network, and of the determined route, to install a direct entry in the network device, wherein the direct entry in the network device is configured to enable the multicast stream through the network device.

14. The apparatus of claim 8, wherein the controller is configured to update the table to reflect the match of the request for the multicast stream with the multicast data transmission.

* * * * *